United States Patent [19]

Goidich et al.

[11] Patent Number: 4,479,458
[45] Date of Patent: Oct. 30, 1984

[54] HEXAGONAL PRESSURIZED FLUIDIZED BED REACTOR

[75] Inventors: Stephen J. Goidich, Palmerton, Pa.; Archibald Robertson, Whitehouse Station; Walter Wolowodiuk, Chatham Township, Morris County, both of N.J.

[73] Assignee: Foster Wheeler Energy Corporation, Livingston, N.J.

[21] Appl. No.: 538,596

[22] Filed: Oct. 3, 1983

[51] Int. Cl.³ .............................................. F22B 1/02
[52] U.S. Cl. ................................. 122/4 D; 110/245; 110/263; 110/295; 110/296; 431/170
[58] Field of Search ............... 110/245, 263, 347, 295, 110/296; 431/7, 170; 122/4 D; 165/104.16

[56] References Cited

U.S. PATENT DOCUMENTS

| 299,881 | 6/1884 | Topliff et al. | 110/295 X |
| 348,932 | 9/1886 | Rugg | 110/295 X |
| 3,589,342 | 6/1971 | Barker et al. | 122/4 D |
| 3,893,426 | 7/1975 | Bryers | 110/245 X |
| 4,184,455 | 1/1980 | Talmud et al. | 122/4 D |
| 4,427,364 | 1/1984 | Bergkvist | 431/170 |

Primary Examiner—Edward G. Favors
Attorney, Agent, or Firm—Marvin A. Naigur; John E. Wilson; Warren B. Kice

[57] ABSTRACT

A reactor in which a plurality of vertical panels are disposed in a vessel and are constructed and arranged so as to form three combustion cells. Three of the panels each form a common wall between adjacent cells, and each cell is heated by a fluidized bed.

18 Claims, 7 Drawing Figures

HEXAGONAL PRESSURIZED FLUIDIZED BED REACTOR

BACKGROUND OF THE INVENTION

This invention relates to a reactor and more particularly to a reactor utilizing a plurality of pressurized fluidized beds disposed in a cylindrical vessel.

Fluidized bed reactors, usually in the form of combustors, boilers, gasifiers, or steam generators, are well known. In a normal fluidized bed arrangement, air is passed through a distributing grid, or plate, which supports a bed of particulate material, usually including a mixture of fuel material, such as high sulfur bituminous coal, and an adsorbent material for the sulfur released as a result of the combustion of the coal. As a result of the air passing through the bed, the bed behaves like a boiling liquid which promotes the combustion of the fuel. In addition to enjoying a capability for considerably reducing the amount of sulfur-containing gases emitted to the atmosphere, such an arrangement permits relatively high heat transfer rates per unit size, substantially uniform bed temperatures, relatively low combustion temperatures, and reduction in boiler tube corrosion and fouling.

Reactors of this type have taken several forms, including an arrangement where more than one fluidized bed is utilized for better control of operating conditions and load following. In these type of arrangements, when the reactor is used as a steam generator, the wall portions enclosing the fluidized beds are normally constructed of water tubes disposed in a spaced parallel arrangement and connected by fins along their lengths to serve dual purposes—to pass the water in a heat-exchange relationship with the heat from the fluidized bed and flue gas and contain the bed material within the corresponding cells. However, when dealing with pressurized fluidized beds of up to ten atmospheres of pressure, the standard waterwall configuration cannot withstand this relatively high pressure. Therefore, the walls must be specially fabricated in a costly manner or they must be enclosed in a cylindrical vessel having a circular cross-section. Since the fluidized bed enclosures have a rectangular cross-section, a great deal of lost space results when they are placed in a vessel with a circular cross section.

SUMMARY OF THE INVENTION

It is therefore an object of the present invention to provide a fluidized bed reactor employing a multitude of fluidized beds which can be enclosed by a cylindrical pressure vessel with a minimum of lost space.

It is a further object of the present invention to provide a reactor of the above type in which standard fabricating techniques can be used to manufacture the panels enclosing the fluidized beds.

Toward the fulfillment of these and other objects, the reactor of the present invention includes a plurality of panels disposed in a cylindrical vessel and constructed and arranged so as to form three combustion cells with three of the panels each forming a common wall between adjacent cells. A fluidized bed is disposed in each cell, and according to a preferred embodiment, the panels are formed by water tubes so that water is passed in a heat-exchange relationship to the fluidized bed to convert the water to steam.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
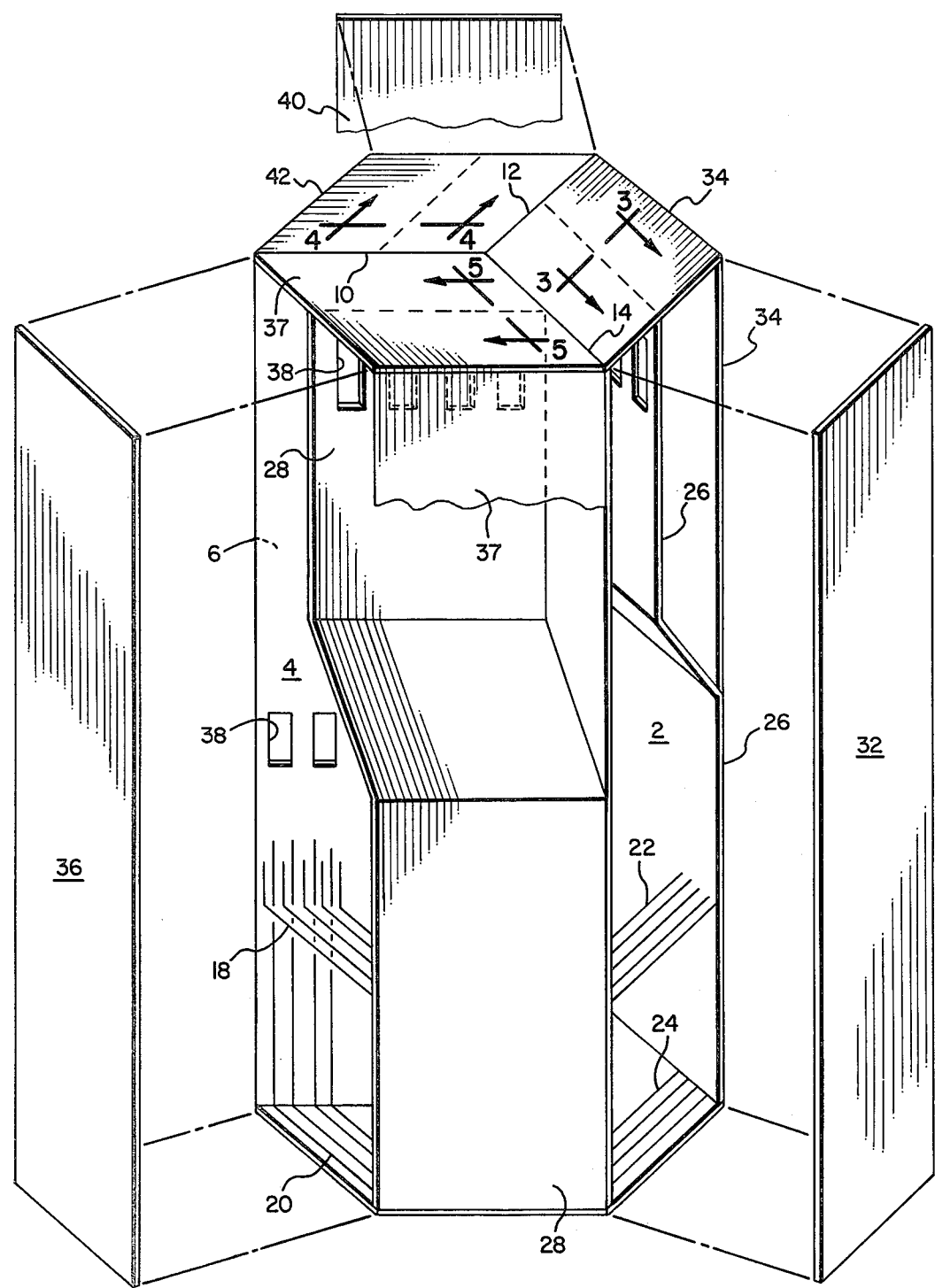
FIG. 1 is an exploded partial perspective view showing a portion of the reactor of the present invention with the water tubes being shown schematically.

Referring to FIG. 1 of the drawings, there is depicted a series of vertical panels constructed and arranged to form three cells 2, 4 and 6 which respectively contain the fluidized beds of the reactor of the present invention. Three of the panels are shown by reference numerals 10, 12, and 14 and are welded together along their common longitudinal edges at 120° angles relative to each other to form common partitions between the respective cells 2, 4 and 6.

Figure 2:
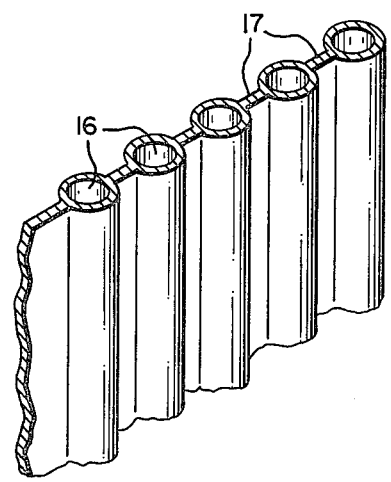
FIG. 2 is an enlarged partial elevational view depicting a portion of a panel according to the present invention.

The panels 10, 12, and 14, as well as the remaining panels depicted in FIG. 1, are formed by a plurality of water tubes as better shown in FIG. 2 of the drawings. More particularly, each panel is made up of a plurality of tubes 16 disposed in a spaced parallel relationship and having two continuous fins 17 extending from diametrically opposed portions thereof with the fins connecting adjacent tubes to form a gas-tight structure.

Referring again to FIG. 1, at the lower portion of the cell 4, half of the tubes 16 forming the panel 10 are bent into a horizontal position to form a water cooled air flow distributor grid 18. The remaining tubes 16 of the panel 10 extend vertically to the lower end of the cell 4 and are bent into a horizontal position to form the floor 20 of the cell 4. The space between the grid 18 and the floor 20 forms an air plenum, as will be discussed in detail later.

In the cell 2, the tubes 16 of the panel 14 are bent in the same manner to form a grid 22 and a floor 24 and air plenum therebetween. Although not clear from FIG. 1, it is understood that the tubes 16 of the panel 12 are bent in the same manner to form a grid and a floor of the cell 6.

Three sidewall panels 26, 28 and 30 are provided for each cell 2, 4 and 6, respectively, and are bent inwardly to form two relatively narrow chambers at the upper portion of each cell. More particularly, the panel 26, associated with cell 2, extends from the floor 24 upwardly and, in the upper portion of the cell, is bent inwardly toward the panel 14 to form two narrow chambers. In a similar manner, a bent panel 28 forms two narrow chambers in the upper portion of the cell 4, and a bent partition 30 (shown by the dashed lines in FIG. 1) forms two chambers in the upper portion of the cell 6.

A sidewall panel 32 is provided for enclosing the cell 2 and extends vertically for the entire length of the cell. A sidewall/roof panel 34 extends from the bent portion of the panel 26 upwardly to enclose one of the narrow chambers formed at the upper portion of the cell 2. The upper end portion of the panel 34 is bent towards the panel 14 to form a roof for the cell 2. The cell 4 is provided with a vertically extending sidewall panel 36 and a sidewall/roof panel 37, and the cell 6 is provided with a vertically extending sidewall panel 40 and a sidewall/roof panel 42. Since these panels are identical to the panels 32 and 34 of the cell 2, they will not be described in any further detail.

The cross-section of the cells 2, 4, and 6 are thus in the form of equilateral parallelograms extending in a side-by-side relationship, sharing the vertial partition panels 10, 12, and 14, and forming an overall hexagon.

A plurality of ports 38 are formed in each of the partition panels 10, 12, and 14 for permitting combustion gases to turn within each cell 2, 4 or 6 or to pass to an adjacent cell as will be described in detail later. The ports 38 are formed by bending selected tubes 16 out of the plane of the panel, with the bent tubes being omitted from FIG. 1 for the convenience of presentation.

Figure 5:
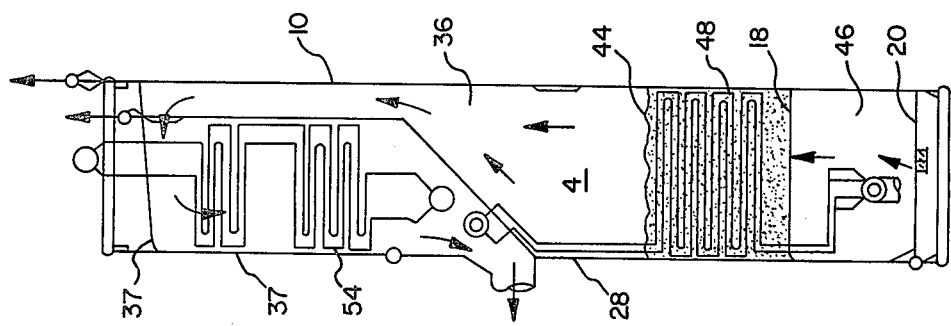
FIGS. 3, 4 and 5 are elevational cross-sectional views taken along the lines, 3—3, 4—4, and 5—5, respectively, of FIG. 1.
Figure 4:
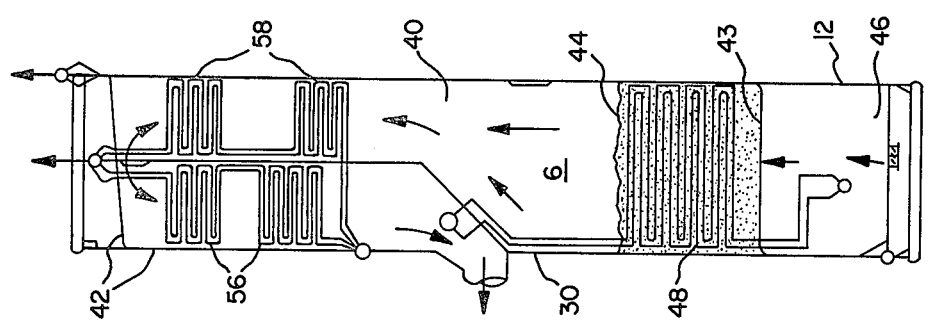
Figure 3:
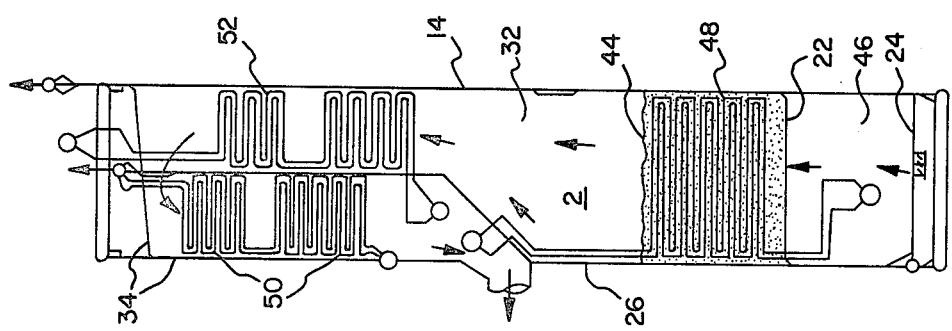

Referring to FIGS. 3, 4 and 5, a bed of particulate material, shown in general by the reference numeral 44, is disposed within each cell 2, 4 and 6 and rests on the grids 18 and 22 of the cells 4 and 2, respectively, and a grid 43 (not shown in FIG. 1) of the cell 6. Each bed 44 can consist of a mixture of discrete particles of fuel material such as bituminous coal, and an adsorbent, such as dolomite, for adsorbing the sulfur released by the combustion of the fuel material. It is understood that appropriate feeders (not shown) can be provided for feeding additional coal and adsorbent to the beds.

As mentioned above, an air plenum is provided between the floor and the grid of each cell 2, 4 and 6 as shown by the reference numeral 46, for distributing pressurized air from an external source (not shown) through the openings in the grid and into each bed 44 for providing air for combustion of the fuel and for fluidizing the particulate material.

A tube bundle, shown in general by the reference numeral 48, is disposed in the lower portion of each cell 2, 4 and 6 and extends within the fluidized bed 44 disposed in the cell. Although not clear from the drawings, two separate tube bundles 48 are disposed in the cell 4, one extending behind the one depicted in FIG. 5. Each tube bundle 48 is formed by a plurality of spaced parallel tubes disposed in a serpentine relationship and connected to appropriate inlet and outlet headers as shown, to provide for circulation of water or steam through the fluidized bed for heating same as will be described in detail later.

Referring specifically to FIG. 3, a pair of additional tube bundles 50 and 52 are respectively disposed in the upper chambers of the cell 2. As shown in FIG. 5, an additional tube bundle 54 is formed in an upper chamber of the cell 4, and, as shown in FIG. 4, a pair of additional tube bundles 56 and 58 are respectively disposed in the upper chambers of the cell 6. The tube bundles 48, 50, 52, 54, 56, and 58 are connected to appropriate inlet headers and outlet headers as shown and to downcomers (not shown) in order to provide for the flow of the fluid to be heated and thus serve to preheat, superheat and reheat the fluid as will be described. Since these inlet and outlet headers and their connections to the respective tube bundles are conventional, they will not be described in any further detail.

Figure 6:
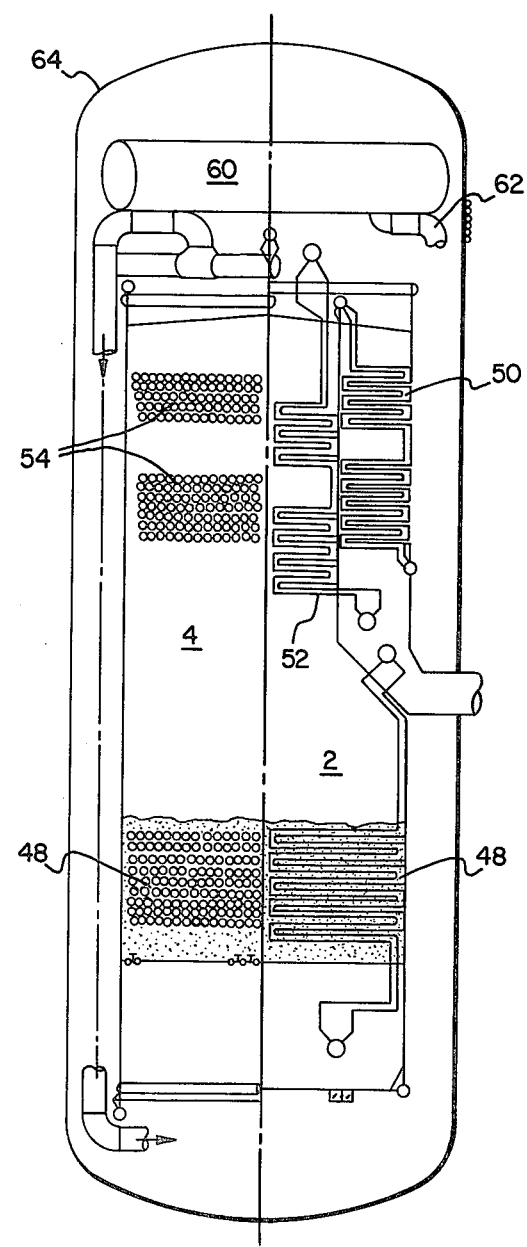
FIG. 6 is an elevational view depicting the reactor of FIG. 1.

Referring to FIG. 6 of the drawings, the reference numeral 60 refers in general to a steam drum which is connected in the aforementioned fluid flow circuit, including a downcomer 62, as will be described in detail later and is adapted to receive a steam-water mixture from the flow circuit and separate same into steam and to water as will be described. An insulated cylindrical vessel 64 encloses the cells 2, 4, and 6, the steam drum 60, and the associated flow circuitry with the aforementioned unique configuration of the combustion cells fitting within the cylindrical vessel 64 with a minimum of lost space. It is understood that the steam drum 60 can be located outside the vessel 64 instead of inside as shown.

In operation, feedwater from the feed cycle is fed via the appropriate piping and headers to the tube bundle 48 associated with the cell 6 which functions as an econimizer and preheats the feedwater before it is directed, again by the appropriate piping, headers, etc., to the steam drum 60. Saturated water from the steam drum is directed to recirculation pumps (not shown) positioned outside the pressure vessel. The water is then pumped through parallel evaporation circuits which consist of the tubes forming the above-mentioned panels along with the tube bundles 56 and 58 in the upper chambers of the cell 6. The steam-water mixture leaving the latter circuits is then directed to the steam drum 60 which is equipped with horizontal steam separators and chevron dryers (not shown) in a conventional manner.

Dry saturated steam from the steam drum 60 is passed through the tube bundle 48 disposed in the fluidized bed 44 associated with the cell 4 before it is directed to the tube bundle 48 in the cell 2 and then to the tube bundle 52 in the other upper chamber of the cell 2 for final superheat. The final main steam temperature can be controlled by dampers used in conjunction with the ports 38 in the common walls 10, 12, and 14, and it is understood that steam by-pass lines may be provided around the tube bundles 48 in the cells 2 and 4 as required for unit turndown.

Reheat steam discharged from the high pressure steam turbine is initially heated in the tube bundle 54 associated with the upper chamber of the cell 4 and heated to a final desired temperature in one of the tube bundles 48 in the latter cell. Final reheat steam temperature can be controlled by additional dampers (not shown) used in conjunction with the openings 38 that control the flue gas flow rate over the tube bundle 54.

According to the present invention, the hexagonal bed cross-section of the present arrangement enables a pressure vessel with a smaller diameter to be used as compared to a square bed cross-section. This reduction in vessel diameter as well as required thickness represents a savings in pressure vessel cost. Just as important, the hexagonal design of the present invention can achieve this savings using conventional steam generator pressure parts, i.e., flat welded panels, flat tube bundles and straight headers. Also, according to the present invention, the multiple beds permit location of steam generation and/or economizer heat transfer surfaces in a separate cell to insure adequate tube cooling during start-up before steam flow is established in the superheater and reheater tubes.

Further the gas flow-through ports 38 provided in the unit's common walls 10, 12, and 14 enable the combustion exhaust gases from each of the unit's three independent operable cells 2, 4 and 6 to be mixed and caused to flow via external dampers over the upper chamber tube bundles in selectively preferred distributions. Thus, by allocating specific duty functions, i.e., either steam generation, superheat, or reheat to these upper chamber tube bundles the unit can maintain superheat and reheat steam temperatures at desired levels over a greatly extended operating range without the need to reduce bed heights or stop the combustion process in any of the cells 2, 4, and 6. For example, as the steam generation rate, and hence the combustion temperature, is reduced, the combustion exhaust gases can be shifted from the upper chamber tube bundles of cell 4 to those of cells 2 and 6 in proper proportions to keep superheat and reheat temperatures at desired levels despite a reduction in combustion exhaust gas temperatures.

Still further, the reduced cross-sectional area of the convection heat transfer surfaces in the upper chambers associated with the cells increases the innertube gas velocities and therefore the heat transfer rates.

The multi-bed hexagonal configuration of the present invention also provides a convenient symmetrical environment for incorporating mechanical dust collectors within the pressure vessel for recycling elutriated bed material back to the fluidized combustion zone. This advantage is apparent from FIG. 7 which depicts an alternate configuration of a cell of the present invention, and, since it is similar to the configuration of cell 2, it will be referred to in general by the reference numeral 2' and identical components used in both cells will be referred to by the same reference numerals. According to the embodiment of FIG. 7, the sidewall/roof panel 34 of the cell 2 is eliminated and a mechanical dust collector 70 is provided adjacent the upper portion of the panel 26. The tube bundles 50 and 52 are located in the right upper chamber of the cell 2 as viewed in FIG. 7, and the upper end portion of the panel 26 is bent horizontally to form the roof of the cell. Otherwise the cell 2' of FIG. 7 is configured identically to the cell 2, it being understood that cell 2' can form a portion of a multicell reactor as in the previous embodiment.

Figure 7:
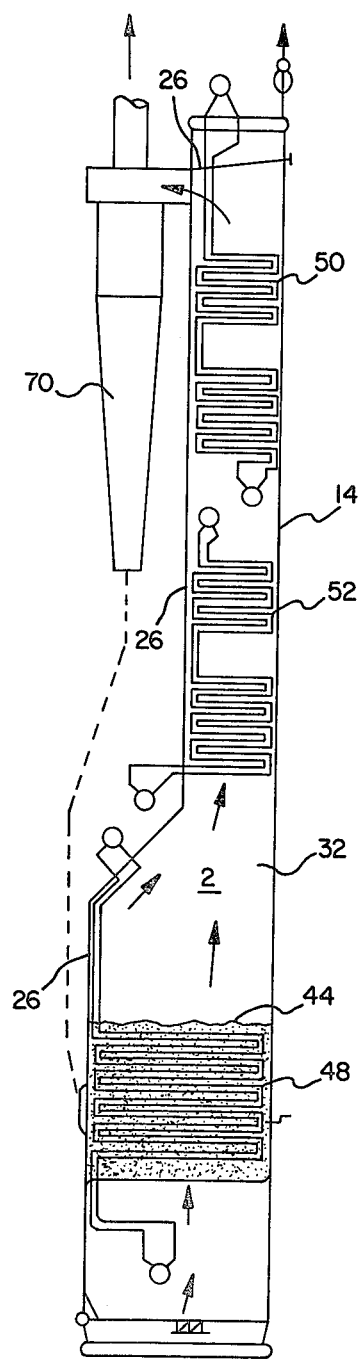
FIG. 7 is a view similar to FIG. 3, but depicting an alternate configuration of a cell of the reactor of the present invention.

Thus the embodiment of FIG. 7 enjoys the advantages of the arrangement of the previous embodiment while enabling the dust collector 60 to be disposed within the pressure vessel.

It is understood that several other variations in the foregoing can be made without departing from the scope of the invention. For example, the reactor of the present invention could be operated with supercritical pressure, thus eliminating the need for the steam drum 60 and its associated fluid flow circuitry.

A latitute of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention therein.

We claim:
1. A reactor comprising a cylindrical vessel, plurality of vertical panels disposed in said vessel and constructed and arranged so as to form three combustion cells, with three of said panels forming common walls between adjacent cells, at least a portion of said panels being formed by water tubes, and means for selectively heating said cells to convert the water flowing through said tubes to steam, a portion of the tubes of one of the panels forming each cell extending in a horizontal position to form an air distribution grid.

2. The reactor of claim 1 wherein the cross-section of each of said cells is in the form of an equilateral parallelogram.

3. The reactor of claim 1 wherein the plan view formed by said panels is hexagonal in shape.

4. The reactor of claim 1 wherein said means for selectively heating said cells comprises means in each cell for supporting a bed of combustible particulate material, and means for introducing air to each bed for fluidizing said bed and promoting the combustion of said material.

5. The reactor of claim 1 further comprising a plurality of heat exchange tubes disposed in at least one of said cells for circulating fluid in a heat exchange relation to the fluidized bed in said cell.

6. The reactor of claim 1 further comprising a plurality of openings formed through at least one of said common walls to permit intermixing of the combustion exhaust gases from said adjacent cells.

7. The reactor of claim 1 wherein the cross-section of at least one of said cells is reduced at the upper portion thereof to form a convection duct and further comprising heat exchange tubes disposed in said upper cell portion for circulating fluid in a heat exchange relation to the combustion exhaust gases from said latter cell to cool said gases.

8. The reactor of claim 1 wherein said grid supports a bed of combustible particulate material, and means for introducing air to said bed for fluidizing said bed and promoting the combustion of said material.

9. A reactor comprising a cylindrical vessel, plurality of vertical panels disposed in said vessel and constructed and arranged so as to form a plurality of combustion cells, a portion of said panels forming common walls between adjacent cells, at least one opening formed through at least one of said common walls to permit intermixing of the combustion exhaust gases from the corresponding adjacent cells, and means for selectively heating said cells.

10. The reactor of claim 9 wherein the cross-section of each of said cells is in the form of an equilateral parallelogram.

11. The reactor of claim 9 wherein the plan view formed by said panels is hexagonal in shape.

12. The reactor of claim 9 wherein said means for selectively heating said cells comprises means in each cell for supporting a bed of combustible particulate material, and means for introducing air to each bed for fluidizing said bed and promoting the combustion of said material.

13. The reactor of claim 9 further comprising a plurality of heat exchange tubes disposed in at least one of said cells for circulating fluid in a heat exchange relation to the fluidized bed in said cell.

14. The reactor of claim 7 wherein the cross-section of at least one of said cells is reduced at the upper portion thereof to form a convection duct and further comprising heat exchange tubes disposed in said upper cell portion for circulating fluid in a heat exchange relation to the combustion exhaust gases from said latter cell to cool said gases.

15. The reactor of claim 9 wherein at least a portion of said panels are formed by water tubes which circulate water to convert same to steam.

16. The reactor of claim 15 wherein a portion of the tubes of one of the panels forming each cell extends in a horizontal position to form an air distribution grid.

17. The reactor of claim 16 wherein said grid supports a bed of combustible particulate material, and means for introducing air to said bed for fluidizing said bed and promoting the combustion of said material.

18. The reactor of claim 9 wherein said panels form three combustion cells and three of said panels form common walls between adjacent cells.

* * * * *